Oct. 4, 1932.  A. B. MULLIN  1,880,463
TIRE REMOVER
Filed Sept. 10, 1930   4 Sheets-Sheet 1
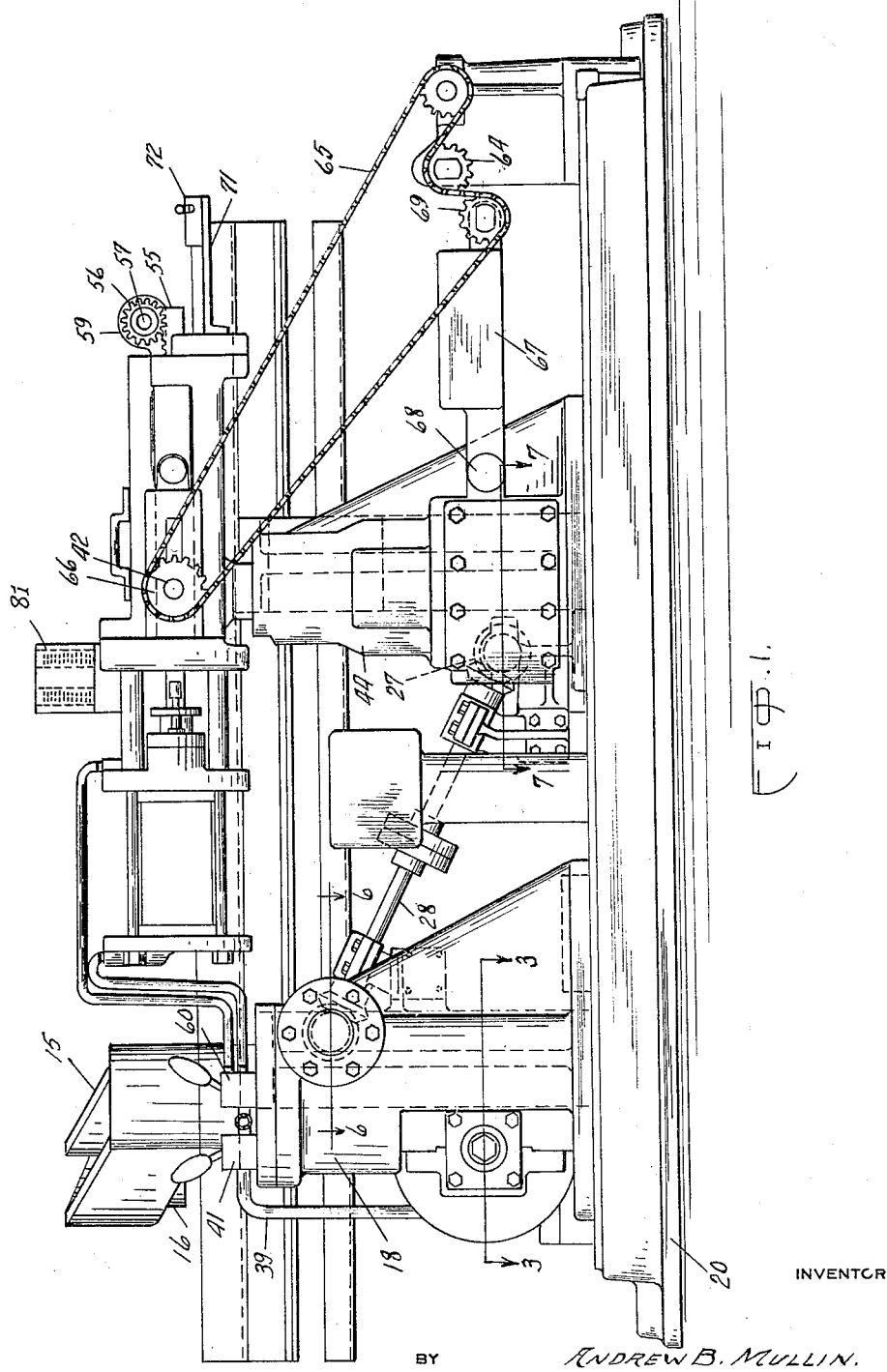
INVENTOR
ANDREW B. MULLIN.
BY
Ely T Barrow
ATTORNEYS,

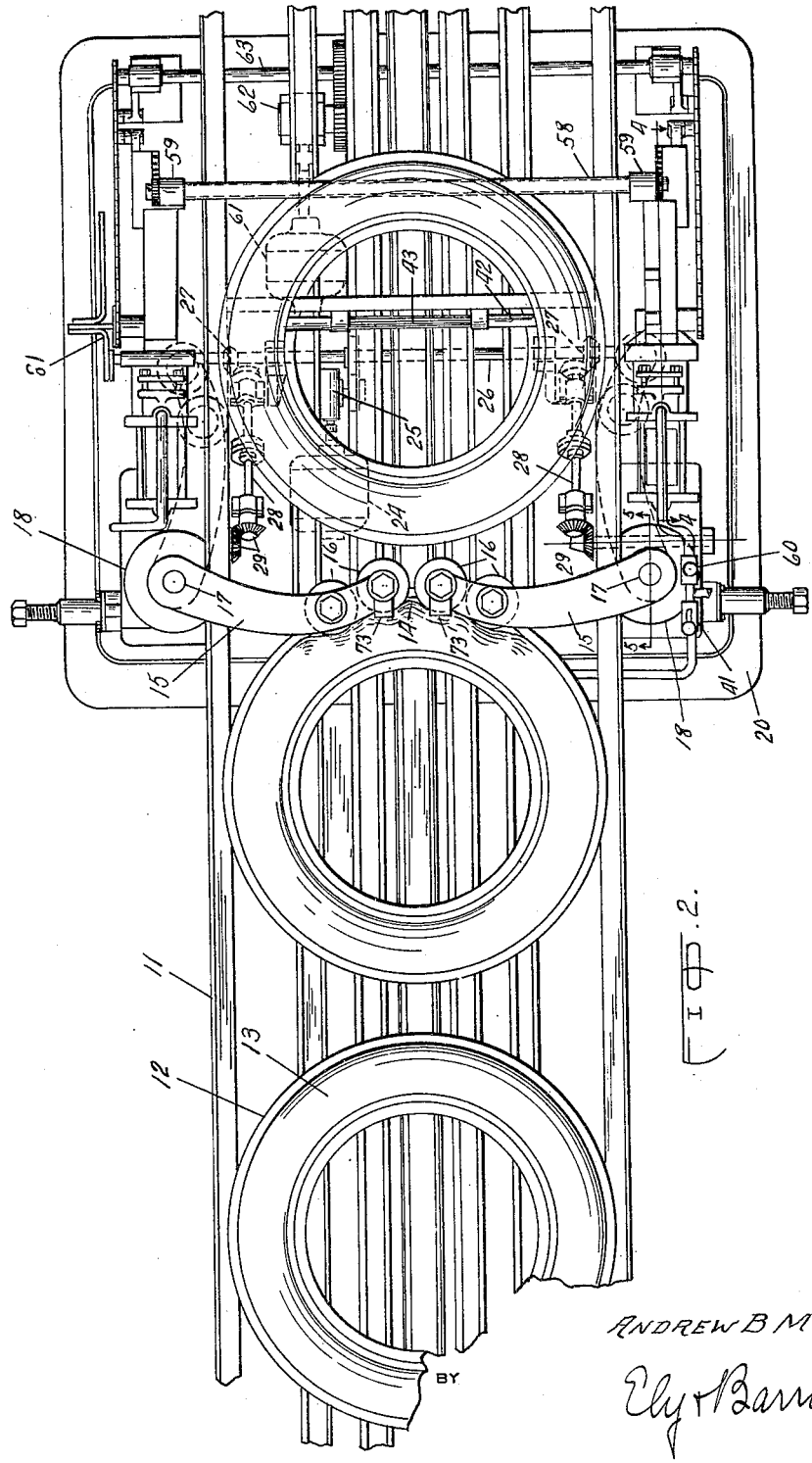

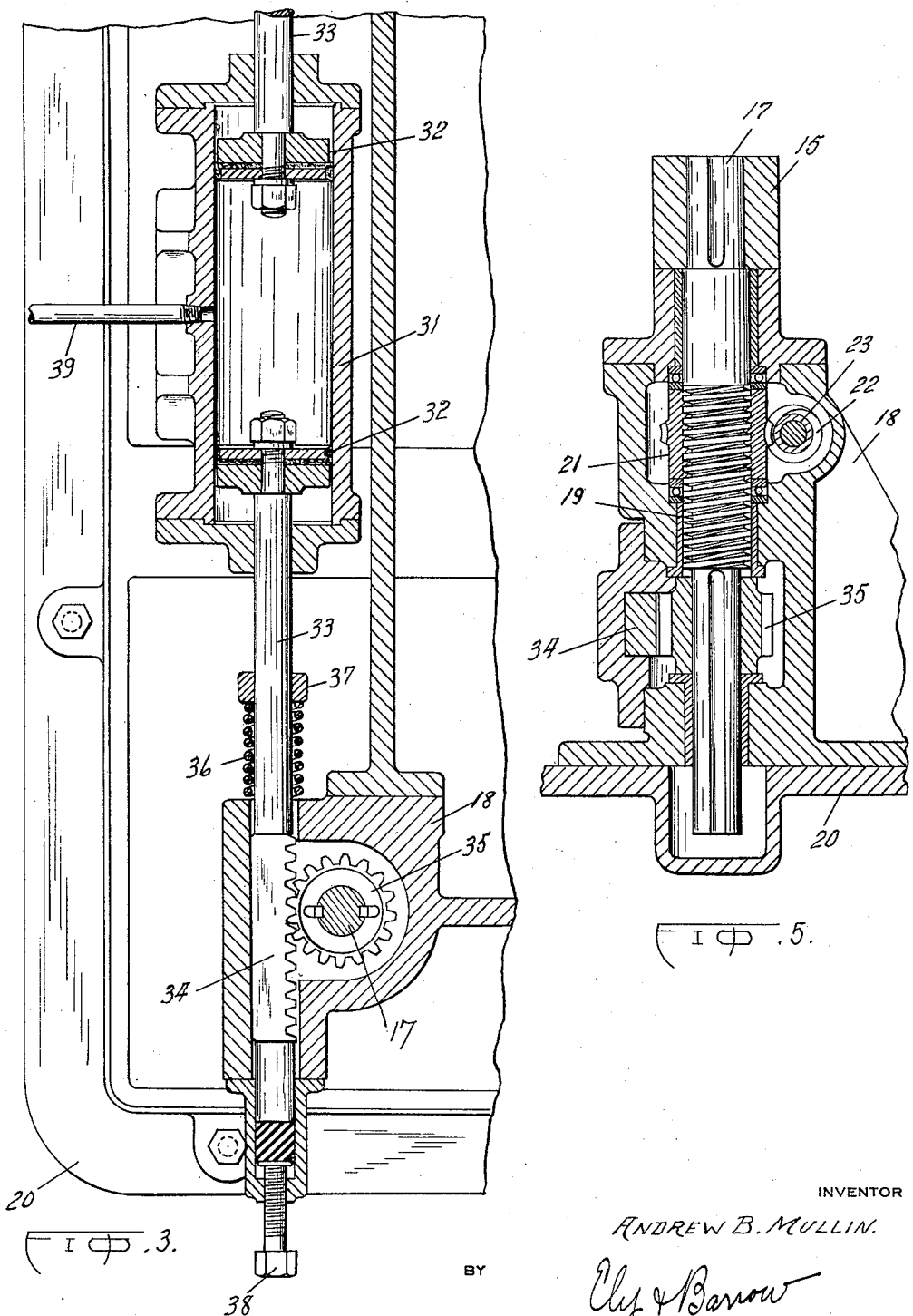

Oct. 4, 1932.  A. B. MULLIN  1,880,463
TIRE REMOVER
Filed Sept. 10, 1930  4 Sheets-Sheet 4
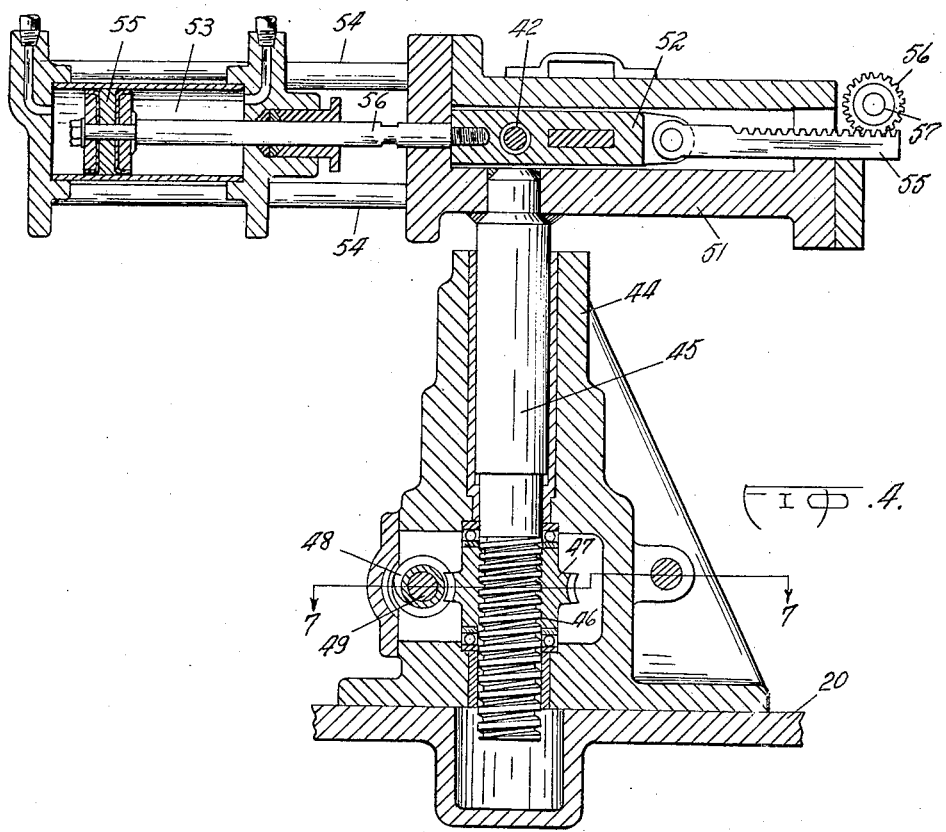
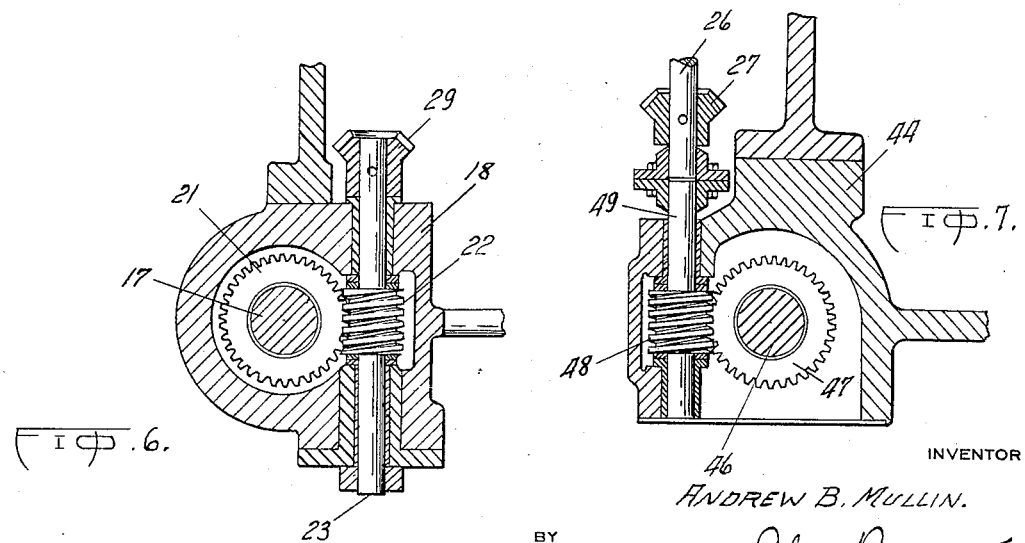
INVENTOR
ANDREW B. MULLIN.
ATTORNEYS.

Patented Oct. 4, 1932

1,880,463

UNITED STATES PATENT OFFICE

ANDREW B. MULLIN, OF AKRON, OHIO, ASSIGNOR TO THE FIRESTONE TIRE & RUBBER COMPANY, OF AKRON, OHIO, A CORPORATION OF OHIO

TIRE REMOVER

Application filed September 10, 1930. Serial No. 480,941.

This invention relates to apparatus for removing pneumatic tires from tire mold sections after the curing or vulcanizing operation.

The general object of the invention is to provide an easily controlled, semi-automatic apparatus for quickly removing pneumatic tires from their tire mold sections after vulcanization.

It is an object of the invention to provide an apparatus which will readily adapt itself to production methods and which can handle a plurality of sized tires and tire mold sections without breakage.

The above and other objects of the invention are achieved by the apparatus illustrated in the accompanying drawings and described below, it being understood that the invention is not limited to the exact details shown or described.

In the drawings:

Figure 1 is a side elevation of the tire removing apparatus.

Figure 2 is a plan view of the apparatus.

Figure 3 is a sectional view taken on line 3—3 of Figure 1.

Figure 4 is a sectional view taken on line 4—4 of Figure 2.

Figure 5 is a sectional view taken on line 5—5 of Figure 2.

Figure 6 is a sectional view taken on line 6—6 of Figure 1.

Figure 7 is a sectional view taken on line 7—7 of Figures 1 and 4.

The invention is designed for use in conjunction with a continuously traveling conveyor 11, of any standard form, which serves to carry tire mold sections 12 containing tires 13. In the embodiment of the invention illustrated the upper half of the mold (not shown) is removed in any suitable manner from the conveyor at some station (not shown) prior to those embodying the present invention.

The forward portion 14 of the tire 13 is first loosened from the mold section 12 and for this purpose a pair of swinging arms 15—15 are provided at opposite sides of the conveyor. One or more roller drums 16 are preferably journaled at or near the ends of the arms 15 and serve as the contacting members between the tire 13 and arms 15. The arms 15 are keyed to a pair of vertical shafts 17—17 journaled in housings 18—18 fixed to a base 20.

In order to take care of different sized tire mold sections the shafts 17, 17 are made vertically adjustable and to this end (Figure 5) the shafts are formed with a screw 19, which cooperates with an internally threaded worm gear 21 in turn rotated or controlled by a worm 22 fixed to a shaft 23 (Figure 6) journaled in the housing 18. The shafts 23 can be controlled by any suitable means, which may comprise an electric motor 24, connected thereto through a gear box 25, shaft 26, bevel gearing 27, shaft 28, and bevel gearing 29.

Referring to Figures 3 and 5 of the drawings, the angular position of both arms 15 is controlled by a single air cylinder 31 fixed to the base 20 of the apparatus. Sliding in opposite ends of the cylinder 31 are a pair of pistons 32 whose rods 33 are made integral with racks 34 which engage with pinions 35 feathered on the vertical shafts 17. The pistons are normally held in to the center of the cylinder 31 by springs 36 acting between the housings 18 and collars 37 fixed to the rods 33. The outward movement of the pistons in the cylinder may be limited by screws 38. Compressed air is supplied to the interior of the cylinder 31 by way of conduit 39, a hand valve 41 being provided to control the passage of air to the cylinder and also to open the cylinder to the atmosphere.

After the tire is loosened at 14 by the swinging arms 15, the tire is peeled from the mold section by a transverse shaft 42, formed with longitudinal ribs, grooves or other configurations as at 43, the shaft being resiliently positioned longitudinally of the conveyor 11 and also made vertically adjustable with respect thereto. This may be accomplished by providing a pair of housings 44 which are secured at opposite sides of the conveyor, to the base 20. The housings 44 journal posts 45 which are made vertically adjustable therein by forming the posts with screw portions 46 which cooperate with internally threaded worm gears 47, rotatable through the agency of worms 48 secured to shafts 49 which are integral with shaft 26.

Secured to the top of the posts 45 are guides 51 (see Figure 4) which serve to slidably support crossheads 52 in which the ends of the shaft 42 are journaled. The positions of the crossheads 52 are controlled by air cylinders 53 fixed to the guides 51 by tie rods 54. The pistons 55 of the air cylinders are connected by rods 56 to the crossheads 52. To insure that the crossheads 52 move together at all times racks 55 are secured to the back of the crossheads which engage with pinions 56 fixed to a shaft 57 journaled in a tube 58 which is secured to the guides 51 by brackets 59. The position of the pistons 55 in the air cylinders 53 is controlled by a hand valve 60 which controls the supply of air to either side of the pistons.

The shaft 42 is rotated by a motor 61 operating through reduction gearing 62, shaft 63, idlers 64, chain drives 65 and sprockets 66 keyed to the extending ends of the rod 42. In order to keep the chain tight in all positions of the crossheads 52 a take-up is provided which may include weights 67, pivoted at 68 and provided with idlers 69.

To prevent breakage of parts a number of limit switches are provided. For example a bracket 71, secured to the guide 51, carries a switch 72 which is adapted to be thrown by the rack 55 when the crosshead 52 is moved to a position near the end of its travel. The swinging arms 15 are also provided with contacting means 73 which are arranged so that if the arms 15 or drums 16 strike the mold an electric circuit will be completed through the metal of the mold section to operate suitable relay mechanism to stop the conveyor 11. When the arms strike the tire, on the other hand, the electrical circuit will not be completed through the non-conducting rubber tire.

Suitable means for indicating the height of the guides 51 and the swinging arms 15 is indicated by the numeral 81.

In the operation of the device the conveyor is continuously driven and carries the tires which are contained in the lower halves of the vulcanizing molds. The molds are cracked or opened and the upper half of the molds is removed at some prior station as is understood in the art. The motor 24 is driven to simultaneously adjust the arms 15 and the guides 51 to the proper height, where the swinging arms will just clear the mold section and strike the tire and where the ribbed shaft 42 will just clear the mold section and engage with the tire. The motor 61 will be started to continuously rotate the ribbed shaft 42.

The arms 15 are normally retained in the dotted position shown in Figure 2 due to the springs 36 and as the valve 41 is thrown so that the interior of the cylinder 31 is open to the atmosphere. As the tire and mold section arrive at the station shown in Figure 2 the operator throws the hand valve 41 which supplies fluid under pressure to the interior of the cylinder 31 by way of the conduit 39. This will rock the shafts 17 and throw the arms 15 against the front portion of the tire which will loosen it in the mold section as shown in Figure 2. After the blow is delivered the hand valve 41 is thrown to its original position to move the arms to their dotted, inoperative position.

If the mold section is too high for the setting of the apparatus the swinging arms 15 will strike the mold section and not the tire which will complete the electric circuit through contacts 73 and the metal mold section to stop the conveyor. The continuous movement of the conveyor carries the tire and mold section from the loosening station to the stripping station where the rotating ribbed shaft 42 engages with the loosened portion of the tire and peels the tire out of the mold section. If the tire is very tightly stuck in the mold section the shaft 42 may not immediately begin to lift the front end of the tire from the mold section which will cause the shaft 42 journaled in the crossheads 52 to move the crossheads back against the air cushion maintained behind the pistons 55. The hand valve 60 controls the air to the cylinder 53.

If the tire is very tightly stuck in the mold section the shaft 42 and crossheads 52 may be moved back to the end of their travel at which time the limit switch 72 will be operated by the extending rack 55 to stop the travel of the conveyor 11 whereby breakage of the apparatus is prevented.

After the tire is peeled from the mold section, the tire is carried over the tube 58 and off to one side of the conveyor upon suitable rollers (not shown) while the mold section continues to move with the conveyor.

The apparatus can be adjusted to take care of various sized tire mold sections by raising or lowering the swinging arms 15 and the shaft 42 through the agency of the motor 24. The extent of swinging movement of the arms 15 may be controlled by adjusting the screws 38.

As many changes could be made in the construction it is intended that all matter shown in the accompanying drawings or described herein shall be interpreted as illustrative only and not in a limiting sense, accordingly various modifications and applications of the invention may be resorted to without departing from the spirit of the invention or the scope of the appended claims.

What is claimed is:

1. In apparatus of the class described, means for continuously moving lower tire mold sections with the tires therein to and from a tire-removing station, means at said station for loosening the forward portion of the tire in its mold section, and additional means spaced from said loosening means for peeling the tire from the mold section.

2. In apparatus of the class described, means for continuously moving lower tire mold sections with the tires therein to and from a tire-removing station, means at said station for loosening the forward portion of the tire in its mold section, additional means spaced from said loosening means for peeling the tire from the mold section, and means for simultaneously controlling the operative height of said tire loosening means and said tire peeling means.

3. In apparatus of the class described, means for continuously moving lower tire mold sections with the tires therein to and from a tire-removing station, means at said station for loosening the forward portion of the tire in its mold section, said means including a pair of swinging arms and fluid pressure means for controlling the swinging movement of said arms, and additional means spaced from said loosening means for peeling the tire from the mold section.

4. In apparatus of the class described, means for continuously moving lower tire mold sections with the tires therein to and from a tire-removing station, means at said station for loosening the forward portion of the tire in its mold section, additional means spaced from said loosening means for peeling the tire from the mold section, said means including a longitudinally ribbed shaft, and means for continuously rotating said shaft.

5. In apparatus of the class described, means for continuously moving lower tire mold sections with the tires therein to and from a tire-removing station, means at said station for loosening the forward portion of the tire in its mold section, said means including a pair of swinging arms and fluid pressure means for controlling the swinging movement of said arms, additional means spaced from said loosening means for peeling the tire from the mold section, said means including a longitudinally ribbed shaft, and means for continuously rotating said shaft.

6. In apparatus of the class described, means for continuously moving lower tire mold sections with the tires therein to and from a tire-removing station, means at said station for loosening the forward portion of the tire in its mold section, said means including a pair of swinging arms and fluid pressure means for controlling the swinging movement of said arms, additional means spaced from said loosening means for peeling the tire from the mold section, said means including a longitudinally ribbed shaft, means for continuously rotating said shaft, and means for simultaneously controlling the operative height of said tire loosening means and said tire peeling means.

7. In apparatus of the class described, means for continuously moving lower tire mold sections with the tires therein to and from a tire-removing station, means at said station for loosening the forward portion of the tire in its mold section, additional means spaced from said loosening means for peeling the tire from the mold section, said means including a longitudinally ribbed shaft, means for continuously rotating said shaft, and means for resiliently positioning said ribbed shaft.

8. In combination, means for continuously moving the bottom section of a tire mold with the tire therein to a tire removing station, a pair of swinging arms at opposite sides of the mold moving means, means for swinging said arms against the tire to loosen it in the mold section, a shaft journaled transversely of the mold moving means, means for continuously rotating said shaft, said shaft being positioned to engage with the loosened tire to strip the tire from the mold section, means for resiliently positioning said shaft, means for stopping the mold section moving means if the shaft is moved to the limit of the resilient positioning means, means for stopping the mold section moving means if the swinging arms strike the mold section and not the tire, and means for simultaneously controlling the height of the swinging arms and said shaft.

9. In combination, means for continuously moving the bottom section of a tire mold with the tire therein to a tire removing station, a swinging arm adjacent the mold section moving means, means for swinging said arm against the tire to loosen it in the mold section, a shaft journaled adjacent the mold section moving means, means for continuously rotating said shaft, said shaft being positioned to engage with the loosened tire to strip the tire from the mold section, means for resiliently positioning said shaft, means for stopping the mold section moving means if the shaft is moved to the limit of the resilient positioning means, means for stopping the mold section moving means if the swinging arm strikes the mold section and not the tire, and means for controlling the height of the swinging arm and said shaft.

10. In combination, means for continuously moving the bottom section of a tire mold with the tire therein to a tire removing station, a swinging arm adjacent the mold section moving means, means for swinging said arm against the tire to loosen it in the mold section, a shaft journaled adjacent the mold section moving means, and means for continuously rotating said shaft, said shaft being positioned to engage with the loosened tire to strip the tire from the mold section.

11. In combination, means for continuously moving the bottom section of a tire mold with the tire therein to a tire removing station, a swinging arm adjacent the mold section moving means, means for swinging said arm against the tire to loosen it in the mold section, a rotatable shaft journaled adjacent the mold section moving means, means for continuously rotating said shaft, said shaft being positioned to engage the loosened tire to strip the tire from the mold section, means for stopping the mold section moving means if the swinging arm strikes the mold section and not the tire, and means for controlling the height of the swinging arm and said shaft.

12. In combination, means for continuously moving the bottom section of a tire mold with the tire therein to a tire removing station, a swinging arm adjacent the mold section moving means, means for swinging said arm against the tire to loosen it in the mold section, a rotatable shaft journaled adjacent the mold section moving means, means for continuously rotating said shaft, said shaft being positioned to engage the loosened tire to strip the tire from the mold section, means for resiliently positioning said shaft, means for stopping the mold section moving means if the shaft is moved to the limit of the resilient positioning means, and means for controlling the height of the swinging arm and said shaft.

13. In combination, means for continuously moving the bottom section of a tire mold with the tire therein to a tire removing station, a swinging arm adjacent the mold section moving means, means for swinging said arm against the tire to loosen it in the mold section, means for stopping the mold section moving means if the swinging arm strikes the mold section and not the tire, and means for controlling the height of the swinging arm.

14. In combination, means for continuously moving the bottom section of a tire mold with the tire therein to a tire removing station, a swinging arm adjacent the mold section moving means, means for swinging said arm against the tire to loosen it in the mold section, and means for stopping the mold section moving means if the swinging arm strikes the mold section and not the tire.

15. In combination, means for continuously moving the bottom section of a tire mold with the tire therein to a tire removing station, a swinging arm adjacent the mold section moving means, and means for swinging said arm against the tire to loosen it in the mold section.

16. In combination, means for continuously moving the bottom section of a tire mold with the tire therein to a tire removing station, a swinging arm, and means for swinging said arm against the tire to loosen it in the mold section.

ANDREW B. MULLIN.